(12) United States Patent
Pugliese, IV

(10) Patent No.: US 9,025,609 B2
(45) Date of Patent: May 5, 2015

(54) VIDEO ROUTER AND METHOD OF AUTOMATIC CONFIGURING THEREOF

(75) Inventor: Anthony V. Pugliese, IV, Delray Beach, FL (US)

(73) Assignee: AVP IP Holding Co., LLC, Delray Beach, FL (US)

(*) Notice: Subject to any disclaimer, the term of this patent is extended or adjusted under 35 U.S.C. 154(b) by 13 days.

(21) Appl. No.: 13/410,459

(22) Filed: Mar. 2, 2012

(65) Prior Publication Data

US 2012/0155483 A1    Jun. 21, 2012

Related U.S. Application Data

(63) Continuation of application No. 12/415,181, filed on Mar. 31, 2009, now abandoned.

(60) Provisional application No. 61/040,963, filed on Mar. 31, 2008.

(51) Int. Cl.
| | | |
|---|---|---|
| *H04L 12/58* | (2006.01) | |
| *H04L 12/56* | (2006.01) | |
| *G06F 15/16* | (2006.01) | |
| *H04L 12/10* | (2006.01) | |
| *H04L 12/40* | (2006.01) | |
| *H04N 7/18* | (2006.01) | |

(52) U.S. Cl.
CPC .......... *H04L 12/10* (2013.01); *H04L 12/40045* (2013.01); *H04N 7/181* (2013.01)

(58) Field of Classification Search
USPC ................ 370/328–352, 401–419, 392–395; 709/231–238
See application file for complete search history.

(56) References Cited

U.S. PATENT DOCUMENTS

| 6,603,769 | B1 | 8/2003 | Thubert et al. | |
|---|---|---|---|---|
| 7,584,433 | B2* | 9/2009 | Kostadinovich | 715/763 |
| 2003/0099246 | A1* | 5/2003 | Cox et al. | 370/400 |
| 2004/0136388 | A1 | 7/2004 | Schaff | |
| 2004/0258074 | A1 | 12/2004 | Williams et al. | |
| 2005/0232167 | A1* | 10/2005 | Gilbert et al. | 370/260 |
| 2006/0242677 | A1 | 10/2006 | Kostadinovich | |
| 2006/0242678 | A1* | 10/2006 | Kostadinovich | 725/105 |
| 2006/0251179 | A1 | 11/2006 | Ghoshal | |
| 2006/0271695 | A1* | 11/2006 | Lavian | 709/229 |
| 2008/0005626 | A1* | 1/2008 | Schaff et al. | 714/48 |
| 2008/0247457 | A1* | 10/2008 | Cromwell et al. | 375/240.01 |
| 2008/0291929 | A1* | 11/2008 | Vogety et al. | 370/401 |
| 2009/0074184 | A1* | 3/2009 | Baum et al. | 380/205 |
| 2009/0086029 | A1* | 4/2009 | Wei et al. | 348/207.1 |
| 2009/0195655 | A1* | 8/2009 | Pandey | 348/158 |
| 2010/0237984 | A1* | 9/2010 | Zenaty | 340/5.2 |

* cited by examiner

*Primary Examiner* — Man Phan
(74) *Attorney, Agent, or Firm* — Blank Rome LLP

(57) ABSTRACT

A video router comprises a multiple port Ethernet switch that may used to connect at least one Internet Protocol (IP) camera; a power over Ethernet unit that supplies power to the at least one connected IP camera; at least one network interface; and a central processing unit (CPU) capable of running a routing software that automatically discovers and configures the at least one connected IP camera.

20 Claims, 2 Drawing Sheets

VIDEO ROUTER AND METHOD OF AUTOMATIC CONFIGURING THEREOF

RELATED APPLICATION

This application is a continuation of U.S. patent application Ser. No. 12/415,181, filed on Mar. 31, 2009; which application claims benefit of priority of U.S. Provisional Patent Application No. 61/040,963, filed on Mar. 31, 2008. The above identified related applications are each incorporated herein by reference.

FIELD OF THE INVENTION

This invention relates to a video router apparatus for internet protocol based video monitoring and surveillance, and a method that automatically discovers and configures internet protocol video cameras that attach to the video router and connects to a video surveillance server.

BACKGROUND OF THE INVENTION

Video cameras that are capable of transmitting video streams utilizing internet protocols (IP) and standards for the purpose of recording and monitoring are becoming widely available. Many different models are available from manufacturers like Axis, Mobotix, IQInVision and Sony. Compare to the existing closed circuit television (CCTV) technology, current generation of IP video cameras have higher resolution, produce superior quality video, support remote viewing, carries a lower installation cost, especially for the cost of cabling, and superior scalability and flexibility. Experts agree that 2007 is considered the year in which worldwide market acceptance of IP Video reached its tipping point.

IP cameras are usually connected to a surveillance server either within a local area network (LAN) that the IP cameras are installed, or to a remote server through a wide area network (WAN), such as the Internet. Since the advent of IP video cameras and network video recorders (NVRs), the implementation and installation of IP video networks has been difficult, time consuming, and very complicated. The installation generally requires manual configuration of individual cameras, and the configuration of the local network infrastructure, such as IP address assignment, port forwarding, subnet mask, and NAT (network address translation) transversal. There exists a need for an apparatus and method that simplifies the detection and configuration of attached IP video cameras and automates the connection to a video surveillance server.

DETAILED DESCRIPTION OF THE INVENTION

Figure 1:
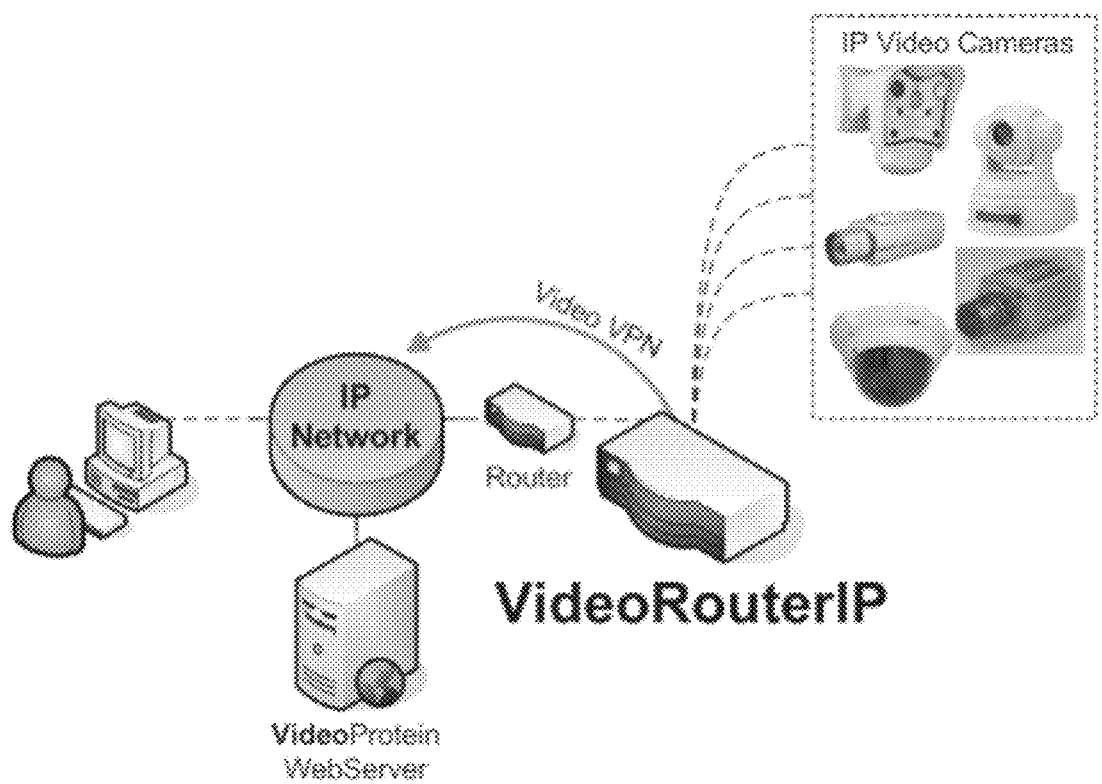
FIG. 1 is a schematic shows one example of the present invention video router in a net work environment.

The present invention video router (to be introduced by VideoProtein as VideoRouterIP®) is the industry's first auto discovering/self configuring router. It automatically detects and recognizes IP video cameras that are connected to its Ethernet ports. The present invention supports IP video camera models from different manufactures, such as Axis, Mobotix, IQInVision and Sony. The video router can be readily configured to support any other camera manufacturers and models. Once the attached IP video cameras are detected, video router then automatically configures the detected IP video cameras, and establishes a connection to a predetermined server, such as a video surveillance server within a local area network (LAN) or a remote surveillance server though an public communication network, such as the Internet. The communication between the video router and the surveillance server can be through a tunneling protocol that encapsulates the data and video stream from the individual IP cameras, and transmit the data and video stream under a different protocol though a public communication network. One such example is virtual private network (VPN). IP video cameras from different physical locations can be configured to appear as within a virtual LAN.

The present invention video router can provide multiple Ethernet ports for the connecting of multiple IP cameras. Additionally, the present invention may also provide power over Ethernet (POE) ports for the transmission of electrical power, along with data, to IP cameras over standard twisted-pair cable in an Ethernet network. In one embodiment of the present invention, the video router can provide 7 Ethernet ports and 4 POE ports.

The present invention also includes an internal storage means. Any digital computer data storage means can be readily incorporated into the video router. For the purpose of illustration without limiting the scope of the invention, the internal storage means can be of magnetic storage devices, such as hard drives, or solid state storage devices, such as nonvolatile memory, e.g., flash memory. The internal storage means can serve as the storage medium for a network video recorder (NVR). The video router may also use any net work attached storage device as the storage means.

The present invention may also provide wireless communication support. For example, the present invention video router may support for Wi-Fi communication based on 802.11a/b/g/n standards, or other wide area wireless communication solutions, such as WiMAX. Additionally, the present invention video router may be used with mobile communication standards such as GSM, GPRS or UMTS.

The present invention video router is also scalable. Multiple video routers can be installed to provide video surveillance for a large area or facility. The installation and configuration complexity of a scaled up network of IP video cameras only linearly relates to the number of the IP cameras.

The flexibility provides by the present invention enables the integration with existing equipment, meaning users can leverage previous equipment investments while still can upgrade the system to the next generation in security technology.

The present invention is simple to use. A user only needs to physically install the IP video cameras and connect them via typical Ethernet cabling such as twisted pair cables (e.g., Cat. 5) back to the video router. The video router automatically discovers and loads the drivers for the discovered IP camera devices. The video router then communicates back to a surveillance server, e.g., VideoProtein web server and then automatically completes additional processes such as registration of devices, port mapping and creation of a video VPN tunnel through the network. VideoProtein is the market leader in browser based IP video camera management software. VideoProtein is built with Java to run on Linux (e.g., RedHat), Sun (e.g., Solaris), Mac or Windows platforms, and will support any IP video device. Any Java capable web browser (e.g., Internet Explorer®, Netscape®, Firefox®, Opera®, and Safari®) can be used with VideoProtein software.

Referring to FIG. 1, the video router is shown in an exemplary IP network. Multiple IP cameras are connected to the video router. Once the IP cameras are discovered and configured by the video router, the video router is connected to a router that in turn connects to an IP network. A connection is established to a host server, e.g., a VideoProtein web server via the router and the IP network. A user can access the VideoProtein web server via the IP network and monitor and control the IP cameras connected to the video router.

Figure 2:
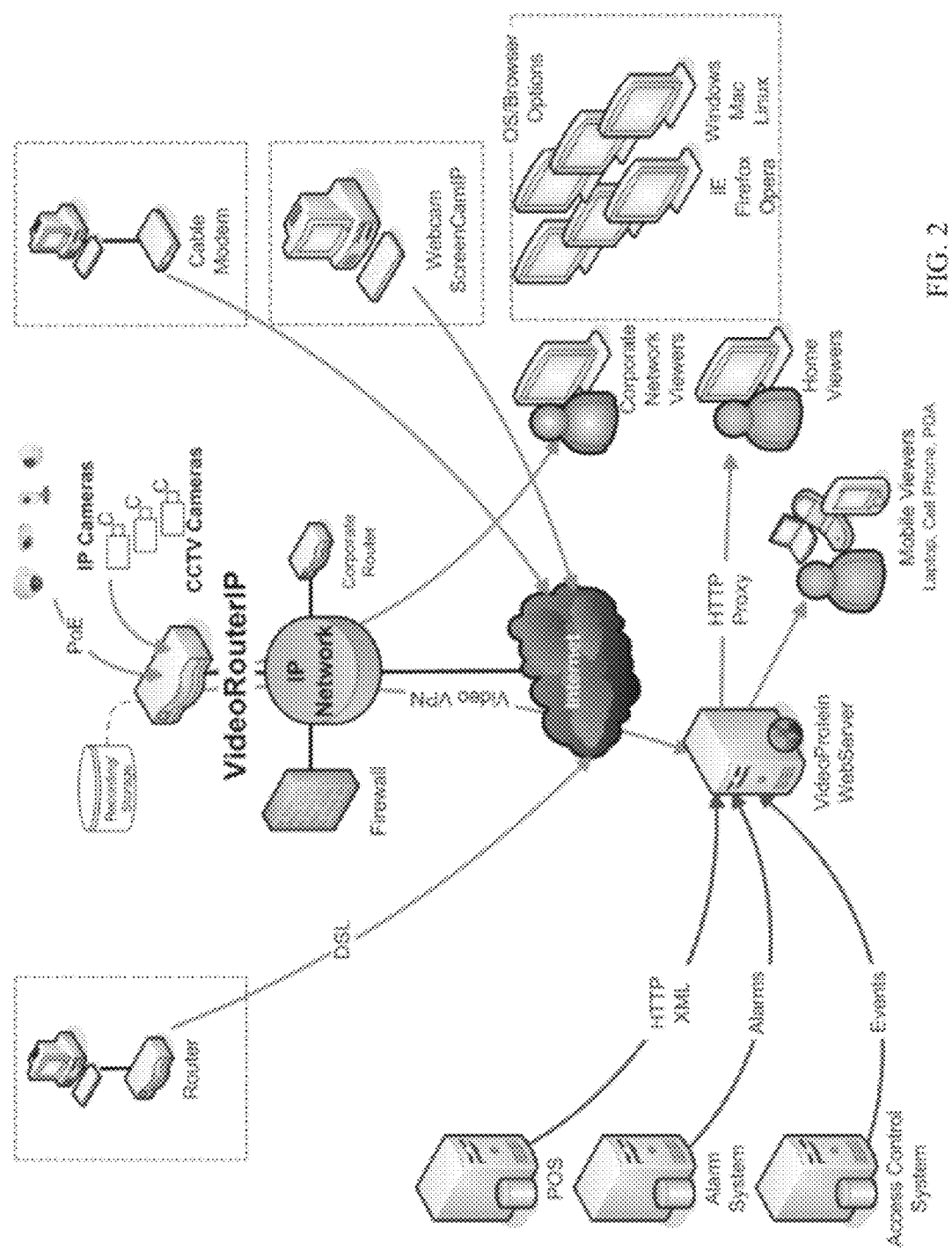
FIG. 2 is a schematic shows one example of the present invention video router in a more complex net work environment.

FIG. 2 presents the video router in a more complex network setup. The video route is installed in a LAN, for example a corporate IP network. Multiple IP cameras are connected to the video router. The video router can also provide power through twisted pair cable, e.g., cat 5 cable to the IP cameras or devices via POE, typically in conformance with 802.11 of standard. Additionally, the video router can also be equipped to accept input from traditional analog CCTV cameras.

Once the cameras are discovered and configured by the video router, the video router is connected to a corporate router that also connects to an IP network. Typically, a firewall is also present in the corporate IP network. The video router can automatically establish a connection with a corporate surveillance server within the corporate IP network or directly provide monitoring or control service to corporate network viewers. The video router may also connect to a remote surveillance server, such as a VideoProtein webserver, through a tunneling protocol, e.g., VPN via a public communication network such as the Internet. Other viewer systems can also have access to the video router through the Internet as long as they have a connection to the Internet, e.g. via DSL or cable modem. Webcams can also be integrated into the video router system via connection to the Internet. The remote surveillance server, in this example the VideoProtein webserver, can act as a hub for other utilities and applications, such as POS, alarm system, and access control system. The VideoProtein webserver can also provide viewing service to home viewers or mobile viewers.

The video router can also have an attached or integral storage means for data and recoding storage. Typically, the storage means is a high capacity hard drive or a series of hard drives. It is also within the scope of this invention to use other storage devices such as solid state storage devices. The video stream from the multiple IP cameras are typically recorded by the video router and stored in the storage means. The video stream can be transmitted to the remote surveillance server. In case that the public network becomes unavailable or unreliable, the video stream from the IP cameras are continuously stored on the video router storage without interruption, and can be transmitted to the remote surveillance server at a later time. An example of remote video content recorder system is disclosed by this inventor in U.S. patent application Ser. No. 11/290,863, filed on Nov. 30, 2005, which is herein incorporated by reference.

In one embodiment of the video router, the apparatus comprises a central processing unit (CPU), a storage unit, one or more net work interfaces (NIC), a POE unit, a multiport Ethernet switch, and one or more interface for other peripherals. The CPU can be an x86 compatible processor or any other general purpose processor. The storage unit is typically a hard drive or a series of hard drives. However, it is also within the scope of the present invention that solid state storage devices can be used. Generally two NICs are employed, one for the connection to LAN and the other for the connection to WAN. The Ethernet switch is connected to the LAN NIC. The POE unit is typically an 802.11af compatible unit that is controlled by the CPU through any appropriate interface, such as PCI or USB. A number of interfaces can be used with the video router. For purpose of illustration without limiting the scope of the present invention, PCMCIA, USB, PCI, PCI Express, and serial port interfaces can be used with the video router.

A routing software is stored on the storage means of the video router, and is loaded when the video router is started. The routing software provides the functionality of the automatic discovery and configuration, and also the communication link to a surveillance server. When an IP camera is plugged into one of the ports of the Ethernet switch, the routing software detects the correct manufacture and model of the IP camera. Network related setups for the IP cameras, such as assigning IP address and setup port forwarding are completed automatically. For example, the individual IP address of each of the detected IP cameras can be assigned using DHCP. The video router then automatically loads the proper driver for the particular make and model or the detected IP camera, and configures video router to receive video stream from the camera and control the camera with the proper control set. The drivers for different cameras are typically stored on the video router storage means. Alternatively, the drivers can be retrieved from a networked location when a particular driver is not found within the video router storage means. This also enables the remote upgrade of the drivers of the IP cameras. The routing software then attempts to "call home." It would attempt to establish connection to a predetermined surveillance server, such as the VideoProtein webserver. Typically, this is through the use of a tunneling protocol, such as VPN. Using this approach, the video router can communicate to the surveillance server even when the video server is behind a firewall. The surveillance server then provides the browser based GUI for remote monitoring and control. An example of automatic detect and configure one or more IP camera is illustrated in U.S. patent application Ser. No. 11/261,237, filed on Oct. 28, 2005, which is herein incorporated by reference.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention.

What is claimed is:

1. A video router, comprising:
   a multiple port Ethernet switch, wherein at least one Internet Protocol (IP) camera is connected to at least one port of the multiple port Ethernet switch;
   a power over Ethernet unit, wherein the power over Ethernet unit supplies power to the at least one connected IP camera;
   at least one network interface; and
   a central processing unit (CPU), wherein the CPU runs a routing software, the routing software:
   automatically discovering and configuring the at least one connected IP camera upon connection of the at least one IP camera to a respective port of the multiple port Ethernet switch;
   establishing connection to a remote surveillance server over a public communication network through use of a tunneling protocol, wherein the remote surveillance server then provides a browser based GUI for remote monitoring and control of the at least one connected IP camera;

wherein automatically discovering and configuring the at least one connected IP camera comprises the steps of:
  detecting manufacture and model information of the at least one connected IP camera;
  automatically locating and loading a driver associated with and compatible to the detected manufacture and model information of the at least one connected IP camera; and
  assigning IP address to and setup port forwarding for the at least one connected IP camera;
wherein, upon automatically locating and loading a driver associated with and compatible to the detected manufacture and model information of the at least one connected IP camera, a framework is established that interacts with a client application, facilitating control of the at least one connected IP camera by a user, through the at least one connected IP camera and driver-independent interface that possesses an operative association with the respective driver and with the at least one connected IP camera, wherein the operative association of the framework with the respective driver and with the at least one connected IP camera provides the client application through the at least one connected IP camera and driver-independent interface with control of the at least one connected IP camera via the respective driver.

2. The video router of claim 1, further comprising a storage unit.

3. The video router of claim 2, wherein the routing software is stored on the storage unit.

4. The video router of claim 2, wherein the storage unit is a hard drive.

5. The video router of claim 2, wherein the storage unit is a solid state storage device.

6. The video router of claim 2, wherein a video stream from the at least one connected IP camera is saved in the storage unit and is later transmitted to the remote surveillance server over the public communication network via the tunneling protocol.

7. The video router of claim 1, wherein the network interface is an Ethernet interface.

8. The video router of claim 1, wherein the network interface is a wireless network interface.

9. The video router of claim 1, comprising two network interfaces.

10. The video router of claim 9, wherein a first network interface is connected to the multiple port Ethernet switch, and a second network interface is connected to a wide area network.

11. The video router of claim 1, wherein the driver is retrieved from a networked location.

12. The video router of claim 1, wherein the driver is stored in a storage unit accessible from the video router.

13. The video router of claim 1, wherein the discovery and configuration of the at least one IP camera further comprises the steps of:
  receiving video stream from the at least one connected IP camera, and
  controlling the at least one connected IP camera with a proper control set.

14. The video router of claim 1, wherein the routing software further provides a communication link to a surveillance server.

15. The video router of claim 14, wherein video stream from the at least one connected IP camera is transmitted to the surveillance server.

16. The video router of claim 14, wherein the communication link is implemented using a tunneling protocol.

17. A video router, comprising:
  a multiple port Ethernet switch, wherein at least one Internet Protocol (IP) camera is connected to at least one port of the multiple port Ethernet switch;
  a power over Ethernet unit, wherein the power over Ethernet unit supplies power to the at least one connected IP camera;
  a first network interface connecting to the multiple port Ethernet switch;
  a second network interface connecting to a wide area network; and
  a central processing unit (CPU) running a routing software, wherein the routing software automatically discovers and configures the at least one connected IP camera, wherein the discovery and configuration of the at least one IP camera comprises the steps of:
    detecting manufacture and model information of the at least one connected IP camera;
    assigning IP address for the at least one connected IP camera;
    automatically locating and loading a driver associated with and compatible to the detected at least one connected IP camera based on the detected manufacture and model information;
    receiving video stream from the at least one connected IP camera, and
    controlling the at least one connected IP camera with a proper control set;
  wherein, upon automatically locating and loading a driver associated with and compatible to the detected manufacture and model information of the at least one connected IP camera, a framework is established that interacts with a client application, facilitating control of the at least one connected IP camera by a user, through the at least one connected IP camera and driver-independent interface that possesses an operative association with the respective driver and with the at least one connected IP camera, wherein the operative association of the framework with the respective driver and with the at least one connected IP camera provides the client application through the at least one connected IP camera and driver-independent interface with control of the at least one connected IP camera via the respective driver.

18. A method of detecting, configuring and connecting an IP video camera to a surveillance server, the method involving:
  a multiple port Ethernet switch, wherein at least one Internet Protocol (IP) camera is connected to at least one port of the multiple port Ethernet switch;
  a power over Ethernet unit, wherein the power over Ethernet unit supplies power to the at least one connected IP camera;
  at least one network interface; and
  a central processing unit (CPU), wherein the CPU runs a routing software, the routing software:
    automatically discovering and configuring the at least one connected IP camera upon connection of the at least one IP camera to a respective port of the multiple port Ethernet switch;
    establishing connection to a remote surveillance server over a public communication network through use of a tunneling protocol, wherein the remote surveillance server then provides a browser based GUI for remote monitoring and control of the at least one connected IP camera;
  wherein automatically discovering and configuring the at least one connected IP camera comprises the steps of:

detecting manufacture and model information of the at least one connected IP camera;
automatically locating and loading a driver associated with and compatible to the detected manufacture and model information of the at least one connected IP camera; and
assigning IP address to and setup port forwarding for the at least one connected IP camera;
wherein, upon automatically locating and loading a driver associated with and compatible to the detected manufacture and model information of the at least one connected IP camera, a framework is established that interacts with a client application, facilitating control of the at least one connected IP camera by a user, through the at least one connected IP camera and driver-independent interface that possesses an operative association with the respective driver and with the at least one connected IP camera, wherein the operative association of the framework with the respective driver and with the at least one connected IP camera provides the client application through the at least one connected IP camera and driver-independent interface with control of the at least one connected IP camera via the respective driver.

19. The method of claim 18, wherein a video stream from the at least one connected IP camera is saved in a storage unit and is later transmitted to the remote surveillance server over the public communication network via the tunneling protocol.

20. The method of claim 18, wherein the discovery and configuration of the at least one IP camera further comprises the steps of:
receiving video stream from the at least one connected IP camera, and
controlling the at least one connected IP camera with a proper control set.

* * * * *